Patented Apr. 3, 1923.

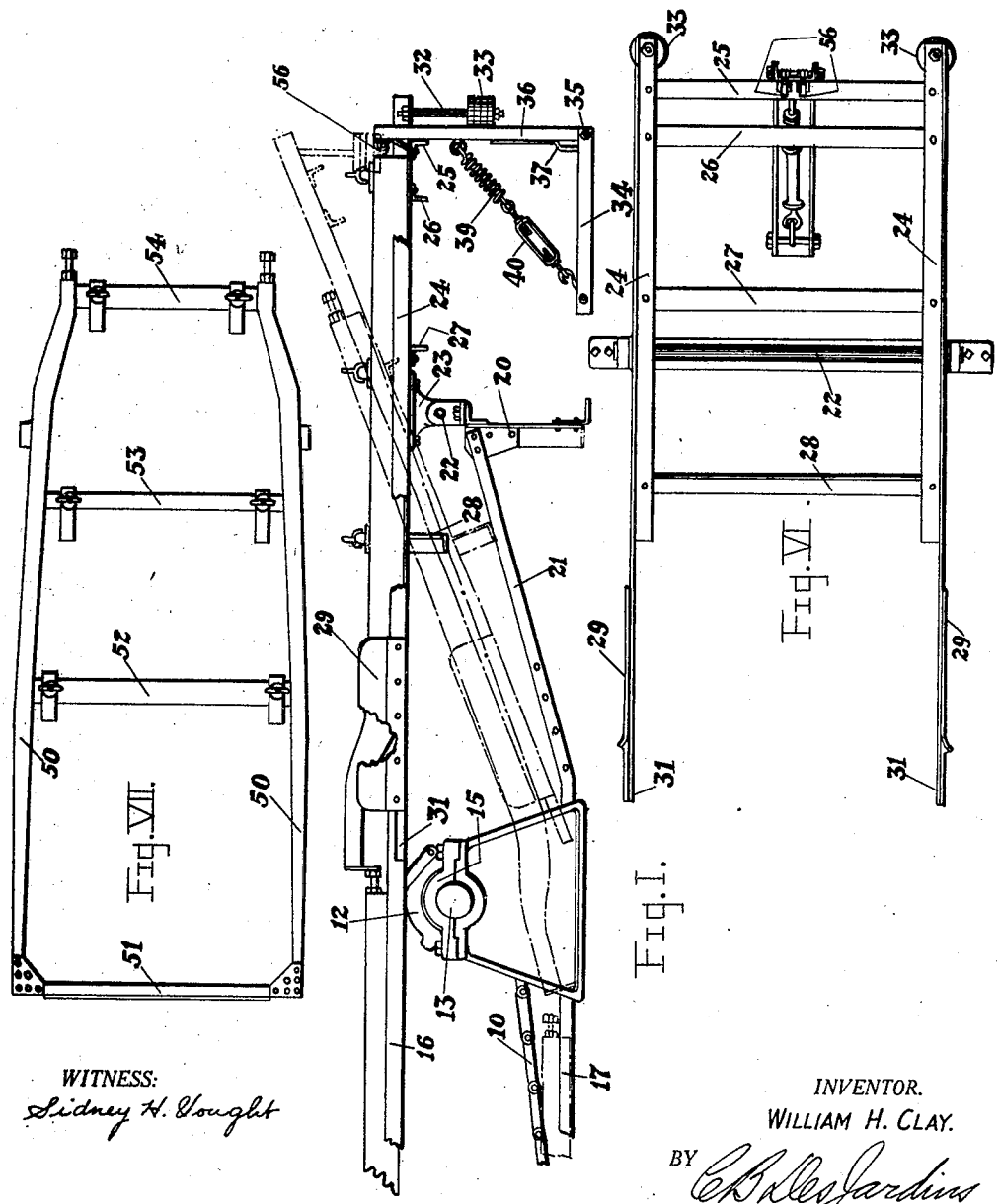

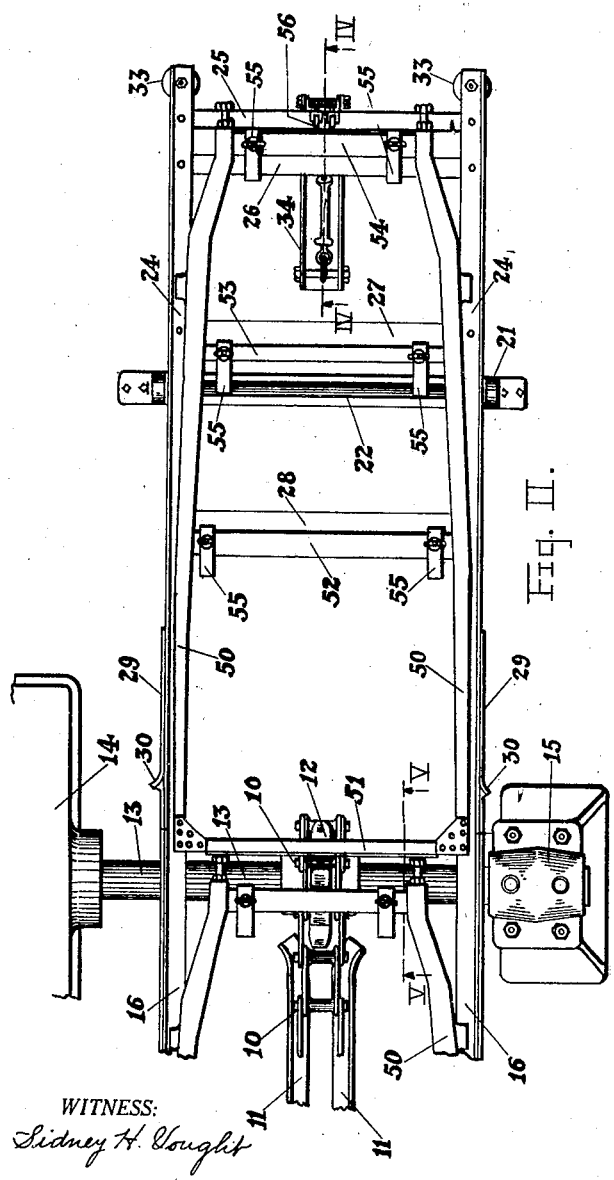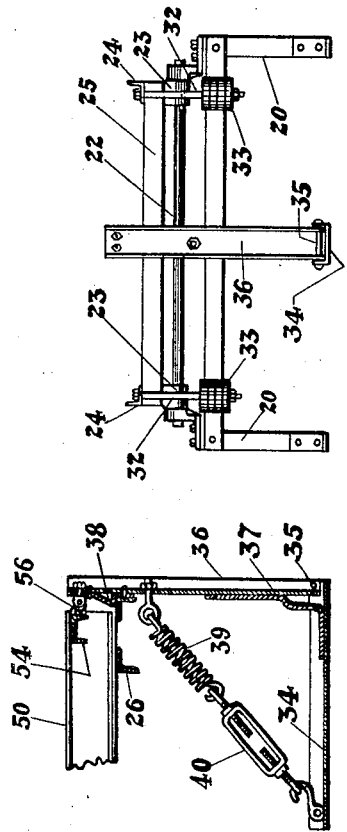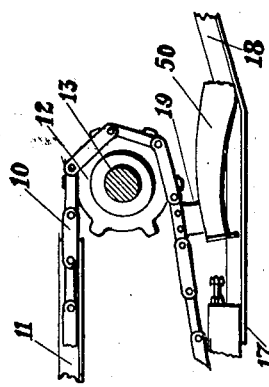

1,450,354

UNITED STATES PATENT OFFICE.

WILLIAM H. CLAY, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

TRANSFER MECHANISM FOR CONVEYERS.

Application filed November 12, 1920. Serial No. 423,764.

*To all whom it may concern:*

Be it known that I, WILLIAM H. CLAY, residing at Philadelphia, Pennsylvania, have invented certain new and useful Improvements in Transfer Mechanism for Conveyers, of which I declare the following to be a full, clear, and exact description.

This invention relates to improvements in transfer mechanism for conveyers.

One of the chief objects of my invention is to provide an entirely automatic mechanism for transferring parts from the carrying to the return stretch of a conveyer.

In many modern industrial establishments, the use of the conveyer chain method of assembly has become quite common. According to this method, the work is carried by a conveyer, which, in most cases, moves rather slowly, and the workmen work on the parts as they are carried along by the conveyer. For instance, in the manufacture of automobile bodies, the bodies are clamped to frames which are carried along by the conveyer mechanism and the workmen perform certain assembling and finishing operations on these bodies while they are carried along. When they reach the end of the conveyer, the clamps are released to release the bodies from the frame and the bodies are removed. It is customary to station two men at the end of the conveyer to remove the frames from the upper or carrying stretch of the conveyer and deliver them to the lower or return stretch, by which they are carried back to the other end of the conveyer mechanism. It is one of the chief objects of my invention to provide mechanism which automatically transfers such frames from the carrying to the return stretch of the conveyer mechanism, thus eliminating the labor of the two men previously referred to.

Further objects, and objects relating to economies of production and details of construction, will definitely appear from the detailed description to follow. I accomplish the objects of my invention by the devices and means described in the following specification. My invention is clearly pointed out in the appended claims. In the accompanying drawings, Fig. I is a view in side elevation of a transfer mechanism embodying my invention shown in connection with a conveyer mechanism.

Fig. II is a top plan view of the mechanism shown in Fig. I.

Fig. III is a view in end elevation.

Fig. IV is a sectional view taken on the line IV—IV of Fig. II.

Fig. V is a sectional view taken on the line V—V of Fig. II.

Fig. VI is a plan view of the transfer mechanism without any load or frame thereon.

Fig. VII is a plan view of the frame which is delivered to and discharged from the transfer mechanism.

In the drawings, similar reference numerals refer to similar parts throughout the several views and the sectional views are taken looking in the direction of the little arrows at the ends of the section lines.

In general, my invention comprises mechanism, which receives frames or other parts from the carrying or upper stretch of the conveyer mechanism and automatically delivers such parts to the lower or the return stretch of the conveyer. In one embodiment of my invention, this mechanism comprises a shifting table which is normally retained in operative relationship with the carrying stretch of the conveyer, so as to receive a load therefrom, and which shifts automatically, when it has received the load, into operative relationship with the return stretch of the conveyer, so as to discharge its load to the return stretch. In the particular embodiment of my invention, which I have illustrated in these drawings, and which I have found very desirable for the particular work previously referred to, I provide a tilting table which is fulcrumed in an unbalanced position at one end of the conveyer mechanism, in position to receive a frame from the upper or carrying stretch of the conveyer. When such a frame is delivered to the tilting table, the table is automatically released, and the center of gravity of the loaded table is so disposed with reference to its fulcrum, that it tilts automatically into a position to discharge its frame to the lower or return stretch of the conveyer mechanism.

This particular embodiment of my invention is illustrated in these drawings in connection with a conveyer mechanism comprising a conveyer chain, 10, the upper or carrying stretch of which rides on the tracks, 11. At one end, the chain rides over a sprocket, 12, mounted on a shaft, 13, driven continuously by drive mechanism, 14, the opposite end of said shaft being journaled in the bearing, 15. I have shown but one end of the conveyer mechanism, but it will be understood that there is a corresponding shaft and sprocket at the opposite end of the mechanism. This particular conveyer mechanism also comprises a pair of parallel upper tracks, 16, and a similar pair of parallel lower tracks, 17. The ends of the tracks, 17, are inclined upwardly at 18, as will be described hereinafter. At intervals, the chain, 10, is provided with flights, 19, which engage the parts to be carried by the conveyer, for instance, the frames, and carry them along on the tracks, 16 and 17.

The transfer mechanism constituting this particular embodiment of my invention comprises a tilting table which may be made of the side rails, 24, connected at intervals by the cross rails or angle bars, 25, 26, 27, and 28. The tilting table thus made up is fulcrumed on a rod, 22, which extends transversely of the frame and is carried by bearing members supported by the standards, 20. These standards, 20, are braced by the inclined braces, 21, to which the upwardly inclined ends, 18, of the lower tracks, 17, may be fastened. The side rails, 24, may well be provided with the bearing members, 23, secured to the lower portions thereof and journaled on the rod, 22. This affords a very convenient means for fulcruming the table. The side rails, 24, are shown of angle cross-section, this being desirable in order to keep the frames from sliding off the sides of the table. Guide plates, 29, are secured to the ends of the side rails, 24, adjacent the conveyer mechanism, and these guide plates have their rear ends outwardly flared at 30, so as to guide the frames from the conveyer to the table. The rear ends, 31, of the side rails, 24, extend beneath the adjacent ends of the tracks, 16, and serve as stops to limit tilting of the table in one direction. At the other end of the table, I fasten, to the ends of the side rails, rods, 32, which carry the weights, 33. This furnishes a very convenient means for weighting this end of the table.

As I have already stated, the ends, 31, of the side rails form stop means for limiting the tilting of the table in one direction. The tilting of the table in the opposite direction is releasably prevented by means of the detent arm, 36, which is pivotally mounted, at 35, on a base plate, 34. A stop arm, 37, may be secured to this pivoted arm, 36, and has a part extending at right angles thereto and co-acting with the base plate to limit the pivotal movement of the detent arm. The arm, 36, is provided, near its upper end, with a detent, 38, which is adapted to engage the cross bar, 25, at the corresponding end of the table, this detent being provided with a beveled upper surface to be engaged by the cross bar, as the table swings down into horizontal position. The pivoted arm, 36, is normally held in vertical position, so as to retain the table in horizontal position, under spring pressure due to the spring, 39, which is connected at one end to the arm, 36, and at the other end to the base plate, 34, through the turn-buckle, 40, by means of which the tension of the spring may be adjusted.

In the drawings, I have shown the frames to which the automobile bodies are clamped as they are carried along the conveyer mechanism. These frames are to be transferred by this transfer mechanism from the upper to the lower stretch of the conveyer, so that they will be returned to the starting point of the conveyer mechanism, and they comprise side rails, 50, which are connected by the cross members, 51, 52, 53 and 54.

The operation of this mechanism should be very clear from the detailed description given above. It will be observed that most of the cross members of the tilting table are positioned on the opposite side of its fulcrum from the conveyer mechanism. This end of the table is also weighted by the weights, 33. The result is that the center of gravity of the unloaded table, that is, without any frame on it, lies on that side of the fulcrum away from the conveyer mechanism. The weight of the frame, which is delivered from the conveyer mechanism to the table, is disposed, however, oppositely, so that the heavy end of the frame rests on the light end of the table with the result that the center of gravity of the loaded table, that is the table with the frame on it, is disposed between the fulcrum of the table and the conveyer mechanism, the centers of gravity of the loaded and unloaded table being on opposite sides of the fulcrum. The table is normally retained in horizontal position in line and in operative relationship with the upper or carrying stretch of the conveyer mechanism, due to the engagement of the detent, 38, with the cross member, 25, of the table. As the frame is carried along by the conveyer, it is delivered to the table and rests thereon, in the position shown in Fig. II, being pushed along on the table by the frame behind it on the conveyer. The frame on the table finally pushes against the upper end of the pivoted detent arm, 36, and forces it back against the tension of the spring, 39, until the detent, 38, no longer engages the cross member, 25. I may, as shown, provide rollers, 56, on the upper end of the detent arm, 36, for engagement by the frame.

This tends to prevent the frame from catching on the detent arm when the table tilts. The center of gravity of this loaded table being between the fulcrum and the conveyer mechanism, the table tilts, as soon as it is released, into the position shown in dotted lines in Fig. I and the frame slides by gravity to the lower tracks, 17, where it is engaged by the flights, 19, of the chain, 10, and carried along the lower tracks or stretch to the other end of the conveyer mechanism. As soon as the chain, 10, has drawn the frame free from the table, since the center of gravity of the unloaded table is disposed on the opposite side of the fulcrum from the conveyer, the table tilts automatically, due to the force of gravity, back to its normal position. The ends, 31, of the side rails, 24, act as stops engaging the ends of tracks 16 to limit the movement in this direction. As it swings back into this normal position, cross member, 25, engages the beveled surface of the detent, 38, and forces the arm, 36, back until the detent snaps over the cross member, 25, to retain the table in its normal position, where it will receive another frame delivered to it from the conveyer mechanism.

It will be seen that this operation is entirely automatic and depends upon the force of gravity. This makes a very efficient mechanism and one which can be operated at practically no cost. This embodiment is, therefore, very desirable, particularly in connection with the transfer of frames such as I have described.

However, I believe that this same invention has other embodiments in which it is equally useful, which embodiments vary, depending largely upon the characters of the parts or members to be transferred. I wish it to be understood, therefore, that I am not to be restricted to the specific embodiment which I have shown and described here, except as required by the appended claims.

Having thus described my invention, what I claim as new and desire to secure by Letters Patent is—

1. A device of the class described comprising the combination with conveyer mechanism having upper and lower stretches provided with means to engage and move the articles to be carried, of a tilting table pivotally mounted at one end of said conveyer mechanism, and adapted to be tilted to and fro to bring it into operative relation with the upper and lower stretches, respectively, of said conveyer mechanism.

2. The combination with a moving conveyer having carrying and return stretches, of a tilting table pivotally mounted at one end of said conveyer and adapted to be tilted to and fro to bring it into operative relationship with the carrying and return stretches, respectively, of said moving conveyer.

3. The combination with a moving conveyer having carrying and return stretches, of a tilting table pivotally mounted at one end of said conveyer and adapted to be tilted automatically to and fro to bring it into operative relationship with the carrying and return stretches, respectively, of said conveyer.

4. The combination with a moving conveyer having carrying and return stretches, of a tilting table pivotally mounted in an unbalanced position at one end of said conveyer and adapted to be tilted automatically by gravity to and fro to bring it into operative relationship with the carrying and return stretches, respectively, of said conveyer.

5. The combination with an endless conveyer belt having parallel carrying and return stretches, of automatic means for transferring parts from the carrying to the return stretch of the conveyer belt.

6. The combination with an endless conveyer belt having parallel carrying and return stretches, of a tilting table mounted at one end of the carrying stretch and pivoted intermediate its ends and adapted to be tilted automatically to transfer a load from the carrying to the return stretch of said conveyer.

7. A device of the class described comprising the combination with a conveyer mechanism having carrying and return stretches, of a tilting table pivotally mounted at one end of said conveyer mechanism and a detent releasably engaging said table and holding it in operative relation with the carrying stretch of said conveyer mechanism.

8. A device of the class described comprising the combination with a conveyer mechanism having carrying and return stretches, of a tilting table fulcrumed in an unbalanced position at one end of said conveyer mechanism and a detent releasably engaging said table and holding it in operative relation with the carrying stretch of said conveyer mechanism.

9. A device of the class described comprising the combination with a conveyer mechanism having carrying and return stretches, of a tilting table fulcrumed at one end of said conveyer mechanism, and a pivotally mounted detent arm spring-pressed into position to engage said table and hold it in operative relation with the carrying stretch of said conveyer mechanism.

10. A device of the class described comprising the combination with a conveyer mechanism having carrying and return stretches, of a tilting table fulcrumed at one end of said conveyer mechanism, stop means limiting the tilting of the table in one direction, and a releasable detent limiting the tilting of the table in the opposite direction.

11. The combination with an endless conveyer belt having carrying and return stretches, of transfer mechanism operating automatically to transfer articles from the carrying stretch to the return stretch of said conveyer belt.

12. The combination with an endless conveyer belt having carrying and return stretches, of mechanism receiving articles from the carrying stretch and automatically shiftable to deliver said articles to the return stretch.

13. A device of the class described comprising the combination with a conveyer mechanism having carrying and return stretches, of a tilting table fulcrumed in an unbalanced position at one end of said conveyer mechanism, stop means limiting the tilting of said table in one direction, and a pivotally mounted detent arm spring-pressed into position to engage said table to limit the tilting thereof in the opposite direction.

14. A device of the class described comprising the combination with a conveyer mechanism having carrying and return stretches, of a tilting table fulcrumed in an unbalanced position at one end of said conveyer mechanism, a pivoted detent arm adapted to engage said table to retain it horizontal, stop means limiting the movement of said arm, and a spring normally holding said arm in engagement with said table.

15. A device of the class described comprising the combination with a conveyer mechanism including upper and lower tracks, of a tilting table fulcrumed at one end of said conveyer mechanism and engaging the upper track to limit its tilting movement in one direction, and releasable means for limiting the tilting of the table in the opposite direction.

16. A device of the class described comprising the combination with a conveyer mechanism including upper and lower tracks, and conveying means operating therealong the lower track having one end upwardly inclined, of a tilting table fulcrumed at the end of said conveyer mechanism, and means retaining said table in operative relation with the upper track, said means being releasable to permit the table to tilt to an inclined position contacting with the upwardly inclined end of the lower track.

17. A device of the class described comprising the combination with a conveyer mechanism having upper and lower tracks, and conveying means operating therealong one end of the lower track being upwardly inclined, of a tilting table fulcrumed in an unbalanced position at one end of said conveyer mechanism and engaging the upper track to limit its tilting movement in one direction, and means limiting the tilting of of the table in the opposite direction, said means being releasable to permit the table to tilt to an inclined position in contact with the upwardly inclined end of the lower track.

18. A device of the class described comprising the combination with a conveyer mechanism including carrying and return stretches, of a tilting table fulcrumed at one end of said conveyer mechanism, and a detent engaging said table to hold it in horizontal position in operative relation with the carrying stretch, whereby articles carried thereby are discharged upon said table, said detent being engaged and actuated by said articles to permit the tilting of the table, whereby the articles are discharged therefrom to the return stretch of the conveyer mechanism.

19. A device of the class described comprising the combination with a conveyer mechanism including carrying and return stretches, of a tilting table fulcrumed in an unbalanced position at one end of said conveyer mechanism, and a pivotally mounted detent arm spring-pressed into position to engage said table and retain it in horizontal position in line with said carrying stretch, whereby parts carried thereby may be discharged to said table, said detent arm being adapted to be engaged and pressed back by said parts to release the table and permit it to tilt and discharge said parts to the return stretch of said conveyer mechanism.

20. A device of the class described comprising the combination with an endless conveyer belt including carrying and return stretches, of a table at one end of the carrying stretch of said conveyer belt, and means normally holding said table in operative relation with the carrying stretch to receive parts therefrom, said table being automatically shiftable into operative relation with said return stretch to discharge such parts thereto.

21. A device of the class described comprising the combination with a conveyer mechanism including carrying and return stretches, of a tilting table fulcrumed at one end of said conveyer mechanism and adapted to receive a load therefrom, and releasable means for retaining said table in horizontal position, said table when loaded being unbalanced, whereby when released it will tilt automatically to discharge its load to the return stretch of the conveyer mechanism.

22. A device of the class described comprising the combination with a conveyer mechanism including carrying and return stretches, of a tilting table fulcrumed in an unbalanced position at one end of said conveyer mechanism and adapted to receive a load therefrom, and releasable means for retaining said table in horizontal position, the transfer of the load to said table resulting in a shifting of the center of gravity from one side to the other of the fulcrum.

23. The combination with a conveyer including carrying and return stretches, of a tilting table at one end of said conveyer fulcrumed intermediate its ends, the center of gravity of the unloaded table being on the opposite side of the fulcrum from the center of gravity of the table and load, when loaded with the part which it is designed to handle, whereby the discharge of a load from the conveyer to said table shifts the center of gravity across the fulcrum of the table, and means preventing the tilting of the table in response to the shifting of the center of gravity until the load is fully discharged on the table.

24. The combination with a conveyer including carrying and return stretches, of a tilting table at one end of said conveyer fulcrumed intermediate its ends, the center of gravity of the unloaded table being on the opposite side of the fulcrum from the center of gravity of the table and load, when loaded with the part which it is designed to handle, whereby the discharge of a load from the conveyer to said table shifts the center of gravity across the fulcrum of the table, and a detent normally preventing the tilting of the table in response to the shift in the center of gravity, said detent being actuated by the load, when fully discharged on the table, to release the table and permit the tilting thereof.

25. The combination with a conveyer including carrying and return stretches, of a tilting table at one end of said conveyer fulcrumed intermediate its ends, the center of gravity of the unloaded table being on the opposite side of the fulcrum from the center of gravity of the table and load, when loaded with the part which it is designed to handle, whereby the discharge of a load from the conveyer to said table shifts the center of gravity across the fulcrum of the table, and a detent normally preventing the tilting of the table in response to the shift in the center of gravity, said detent being actuated by the load, when fully discharged on the table, to release the table and permit the tilting thereof, and said table, when the load is discharged therefrom, returning by gravity to its receiving position in cooperative relationship with the carrying stretch of the conveyer.

26. The combination with a conveyer including carrying and return stretches, of a tilting table at one end of said conveyer fulcrumed intermediate its ends, the center of gravity of the unloaded table being on the opposite side of the fulcrum from the center of gravity of the table and load, when loaded with the part which it is designed to handle, whereby the discharge of a load from the conveyer to said table shifts the center of gravity across the fulcrum of the table, and a detent normally preventing the tilting of the table in response to the shift in the center of gravity, said detent being actuated by the load, when fully discharged on the table, to release the table and permit the tilting thereof and said table, when the load is discharged therefrom, returning by gravity to its receiving position in cooperative relationship with the carrying stretch of the conveyer and being automatically engaged by the detent upon its return to receiving position.

In testimony whereof, I affix my signature.

WILLIAM H. CLAY.